United States Patent Office 3,461,833
Patented Aug. 19, 1969

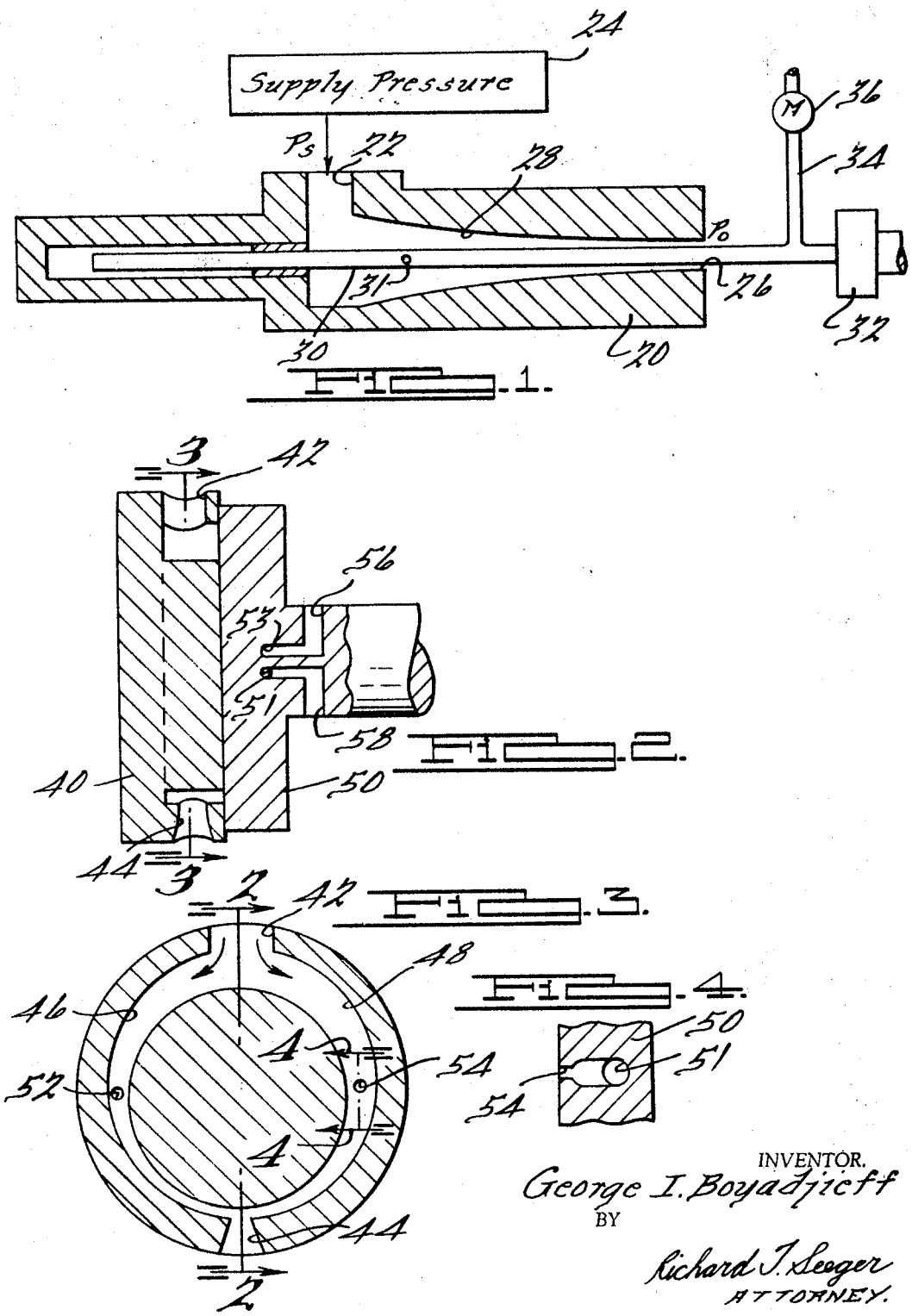

3,461,833
FLUID VARIABLE PRESSURE DEVICE
George I. Boyadjieff, Pontiac, Mich., assignor to The Bendix Corporation, a corporation of Delaware
Filed Dec. 27, 1966, Ser. No. 605,041
Int. Cl. G08b *1/06*
U.S. Cl. 116—65  7 Claims

ABSTRACT OF THE DISCLOSURE

An apparatus for providing a variable output pressure having a convergent duct for flow of a fluid therethrough in combination with an orifice being movable along the duct.

---

This invention pertains to a fluid variable pressure device and method for manufacture and more particularly to a passage having a fluid pressure drop thereacross with an orifice movable along the passage for sensing and utilizing the pressure in the passage at the point of the orifice.

It is known in the art to pass fluid through a passage having parallel walls to obtain a pressure drop across the passage and then move and orifice along the passage to sense or use the fluid pressure at the point of the orifice in the passage. This type of fluid device had serious limitations of a very low pressure drop for a given passage length. In such a parallel wall passage, laminar flow, which is necessary for a controlled linear pressure drop, becomes turbulent at a relatively low fluid flow through the passage. Due to the low pressure drop across the passage, for a given movement of the orifice there is a correspondingly lower change in pressure and a resulting lower sensitivity.

This invention overcomes this limitation by providing passage walls that converge in a longitudinal direction in a predetermined manner so that a controlled pressure drop, such as a linear pressure drop, can be preserved for any desired pressure at the passage output up to and including the critical pressure which occurs with sonic flow at the passage output.

It is therefore an object of this invention to improve upon previous fluid pressure devices by providing a passage having non-parallel or converging walls which converge in a manner determined by this invention to preserve a controlled pressure drop up to and including sonic flow.

It is a further object of this invention to obtain the passage wall design of the previous object by computing the passage cross-sectional area at a plurality of points along the passage utilizing the characteristics of the fluid flowing in the passage and the desired pressure at the output of the passage.

These and other objects will become more apparent when preferred embodiments are described in connection with the drawings in which:

FIGURE 1 is a longitudinal cross-section of a first embodiment of this invention;

FIGURE 2 is a cross-section of a second embodiment of this invention;

FIGURE 3 is a section taken at 3—3 of FIGURE 2; and

FIGURE 4 is a section taken at 4—4 of FIGURE 3.

Embodiment of FIGURE 1

In FIGURE 1 is shown housing 20 having input port 22 which is connected to a supply pressure source 24 and has an output port 26. A duct 28 is formed between input port 22 and output port 26 for conducting the flow from the pressure source 24 to output port 26 and atmosphere in this embodiment. As can be seen, the walls of duct 28 converge as output port 26 is approached and the manner of their convergence will be later discussed.

Mounted for reciprocal movement in duct 28 is hollow probe 30 which has orifice or static pressure tap 31 formed therein. Probe 30 is movable by member 32 which may be manually operated or operated by the movement of a work piece being controlled, or other member. A branch 34 is tapped into probe 30 and connects to a meter 36, or other load member which may be operated by a fluid pressure in branch 34.

When fluid is flowing in duct 28, there is a pressure drop between port 22 and port 26. Movement of probe 30 in duct 28 will change the position of orifice 31 and as a result the pressure in probe 30 will be changed corresponding to the position of orifice 31. For example, if orifice 31 is near input port 22, the pressure will be high and as the orifice 31 is moved towards output port 26 the pressure will become gradually lower. Therefore, this device may be used as a position sensor with member 32 being connected to the position to be sensed. Movement of member 32 will cause a corresponding change in the pressure in probe 30 and this change may be read on meter 36. Also, this device can be a variable pressure source with a manual or other movement of member 32 supplying a corresponding pressure in branch 34.

In devices of the prior art, the pressure drop between input port 22 and output port 26 was limited because the duct 28 had parallel sides, such as those in a conventional pipe, and with such a duct the pressure drop that is obtainable with laminar flow is limited as is well understood in the art. Due to the relatively low pressure drop of prior devices between the input port and exhaust port 26, the sensitivity of the instrument was significantly reduced. In other words, for a given movement of the probe, the pressure change, as read at the meter, is relatively small. With this invention, the pressure drop between ports 22 and 26 is maximized to a point where critical pressure, which for air is .528 of the supply pressure, is at port 26. Critical pressure is that pressure accompanying sonic flow at the exhaust port 26. Critical pressure is a fraction of the supply pressure with the fraction depending on the nature of the supply gas. As mentioned, for air, the critical pressure is .528 of the supply pressure. This fraction is available for common gases in "The Dynamics and Thermodynamics of Compressible Fluid Flow" by Ascher H. Shapiro, the Ronald Press Company, 1958. The design of duct 28 to obtain these relationships will now be discussed.

For the convergent duct 28, it is convenient to normalize the specific volume and velocity equations as functions of the specific volume and velocity at the exit area 26 or throat of the duct. It is also convenient to specify the equations in terms of the desired pressure $P_x$ at a position "x" along the length of the duct as a ratio of the supply pressure $P_s$. This second normalization can be used provided the entrance velocity is small and negligible. From standard texts on compressible flow, for example the Shapiro text supra, these equations are given as $$\frac{u_x}{u^*} = \sqrt{\frac{1-\left(\frac{P_x}{P_s}\right)^{\frac{\gamma-1}{\gamma}}}{1-\frac{P^*}{P_s}\frac{\gamma-1}{\gamma}}} \quad (1)$$

$$\frac{v_x}{v^*} = \left(\frac{P^*}{P_x}\right)^{\frac{1}{\gamma}} \quad (2)$$

where $P_s$ = supply pressure
$P^*$ = the exhaust pressure which may be the critical pressure which is a known fraction of $P_s$
$u^*$ = output velocity at pressure $P^*$
$v^*$ = specific volume at output port for $P^*$
$u_x$ = fluid velocity at point $x$ along the duct
$v_x$ = fluid specific volume at point $x$ along the duct
$\gamma$ = ratio of specific heats for a gas and for air is 1.4

$u^*$ and $v^*$ may be found knowing what fluid is used, the throat area, and $P^*$ from Shapiro text, supra. The throat area is the cross-sectional area of duct 28 at output 26 minus the cross-sectional area of probe 30.

A $P_x$ is selected for a plurality of points along duct 28 and for each point, $u_x$ and $v_x$ are computed by Equations 1 and 2. Then the area $A_x$ of the duct 28 minus the area of probe 30 at each point $x$ is computed from Equation 3 below. The number of points for which the area $A_x$ is found will vary but satisfactory results have been obtained with ten points found for a duct one inch long.

To determine the required duct area distribution, the following continuity equation for a perfect gas flowing adiabatically and reversible is used:

$$A_x = W v_x / u_x \qquad (3)$$

where $W$ = the flow rate through the duct (a constant along the duct) may be determined from throat area and $u^*$ and $v^*$ in the Formula 4 below
$v_x$ = the specific volume of the gas at point $x$
$u_x$ = the velocity of the gas at point $x$
$A_x$ = the cross-sectional area of the duct 28 at point $x$, minus the cross-sectional area of probe 30

$$W = A^* u^* / v^* \qquad (4)$$

where $W$ = the flow rate through the duct (a constant along the duct)
$A^*$ = throat area
$u^*$ = velocity at output 26 for pressure $P^*$
$v^*$ = specific volume at output 26 for $P^*$ Any pressure distribution along duct 28 may be obtained by selecting the appropriate $P_x$'s along the duct and a wide range of output pressures may be realized. Due to the wide range of pressure distributions possible, this invention is capable of a wide variety of applications. In previous devices, the flow in the duct corresponded to a Reynolds number of less than 2300 whereas with this invention, the flow in the duct corresponds to Reynolds numbers in excess of 2300 and may be as high as one million.

Embodiment of FIGURES 2, 3 and 4

FIGURES 2, 3 and 4 show an embodiment operating on a similar principle but having generally circular ducts which are rotatable relative to the orifices so that instead of rectilinear motion of the orifice, rotational motion of the orifice is possible.

Housing 40 has input port 42 and exhaust port 44 which ports are connected by generally circular ducts 46 and 48. Circular member 50 contains orifices 52 and 54 which are connected respectively to signal passages 56, 58. Member 50 is rotatable relative to housing 40 so that the orifices 52, 54 are movable in ducts 46, 48 and sense or use the pressure at that point of the ducts that the orifices are moved to.

There is a pressure drop in each duct 46, 48 between input port 42 and exhaust 44. Each of the ducts 46, 48 are formed in the manner above described for duct 28 and hence any pressure distribution and any output pressure at exhaust 44 up to critical pressure may be obtained while maintaining laminar flow in ducts 46, 48. As member 50 is rotated clockwise, the pressure in orifice 52 will decrease and the pressure in orifice 54 will increase. Of course a circular fluid device may be designed having only one duct and one movable orifice.

Having thus described my invention, I claim:

1. Apparatus comprising
   walls defining a duct having an input and an output being adapted to carry a fluid flow between said input and output, said duct including means between said input and said output for providing a predetermined continuous convergence in the direction of said fluid flow; and
   output means being adapted for movement along said convergent means communicating with said fluid at selectable points along said convergent means for providing an output signal indicative of the pressure of said fluid at said selectable points.

2. The apparatus of claim 1 wherein said convergent means has an axis defining the center thereof which is rectilinear and said output means is adapted for rectilinear movement corresponding to said axis.

3. The apparatus of claim 2 wherein said output means includes a hollow probe movable through said convergent means having an opening therein for communicating the interior of said probe with fluid in said convergent means at selectable points along said convergent means so that the interior of said probe is subject to a pressure corresponding to the pressure in said convergent means at said selectable points.

4. The apparatus of claim 1 wherein said output signal is a pressure signal and which further includes pressure responsive utilization means operably connected to said output means for receiving said output pressure signal.

5. The apparatus of claim 1 wherein said convergent means has a center definable by a circular line and said output means is adapted for movement along a circular path corresponding to said line.

6. The apparatus of claim 5 wherein said walls defining said duct include
   a first plate and a second plate mounted for rotational movement relative to each other; and
   said output means is formed in one of said plates for movement along said duct as the two plates are rotated relative one another.

7. The apparatus of claim 6 with
   said first plate having two ducts formed therein and
   said second plate having two output means formed therein so that one output means moves along one duct and the other output means moves along the other duct as the two plates are rotated relative one another.

References Cited

UNITED STATES PATENTS

| | | | |
|---|---|---|---|
| 2,831,505 | 4/1958 | Menard | 138—45 |
| 2,833,311 | 5/1958 | Baldelli | 138—43 |
| 2,840,096 | 6/1958 | DuBois | 138—43 |
| 2,911,787 | 11/1959 | Barry | 138—45 |
| 3,045,705 | 7/1962 | Hausammann | 138—45 |
| 3,148,703 | 9/1964 | Kachline | 137—608 |
| 3,150,686 | 9/1964 | Kachline | 137—608 |
| 3,373,772 | 3/1968 | Hilgert | 138—43 |
| 3,313,313 | 4/1967 | Katz | 137—815 |
| 3,375,842 | 4/1968 | Reader | 137—815 |
| 3,398,759 | 8/1968 | Rose | 137—815 |
| 3,403,692 | 10/1968 | Shiiki | 137—815 |

SAMUEL SCOTT, Primary Examiner

U.S. Cl. X.R.

137—81.5, 608